United States Patent
Wang

(10) Patent No.: US 10,824,990 B2
(45) Date of Patent: Nov. 3, 2020

(54) MERCHANDISE MANAGEMENT DEVICE AND MERCHANDISE MANAGEMENT METHOD

(71) Applicant: TOSHIBA TEC KABUSHIKI KAISHA, Tokyo (JP)

(72) Inventor: Xiaozhou Wang, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 66 days.

(21) Appl. No.: 16/167,635

(22) Filed: Oct. 23, 2018

(65) Prior Publication Data

US 2019/0122168 A1   Apr. 25, 2019

(30) Foreign Application Priority Data

Oct. 25, 2017   (JP) .................................. 2017-206196

(51) Int. Cl.
  *G06Q 10/08*   (2012.01)
  *G06K 9/00*    (2006.01)
  *H04N 7/18*    (2006.01)

(52) U.S. Cl.
  CPC ....... *G06Q 10/087* (2013.01); *G06K 9/00624* (2013.01); *H04N 7/181* (2013.01); *H04N 7/183* (2013.01)

(58) Field of Classification Search
  CPC ........... G06K 9/00624; G06K 9/00771; H04N 7/181; H04N 7/183; G06Q 10/087
  USPC ............................................... 705/23, 24, 28
  See application file for complete search history.

(56) References Cited

U.S. PATENT DOCUMENTS

| | | | | |
|---|---|---|---|---|
| 8,460,895 B2* | 6/2013 | Eisenkraetzer | ...... | C12N 5/0018 435/69.1 |
| 8,527,307 B2* | 9/2013 | Hamilton, II | .......... | G06Q 30/02 705/7.11 |
| 8,606,642 B2* | 12/2013 | Siounis | .............. | G06Q 30/0643 705/26.1 |
| 8,860,775 B2* | 10/2014 | Liu | .......................... | H04N 7/15 348/14.05 |
| 9,449,343 B2* | 9/2016 | Mayerle | ............. | G06Q 30/0643 |
| 10,354,222 B2* | 7/2019 | Jones | ................. | G06K 7/10366 |
| 10,482,527 B2* | 11/2019 | Porter | ................ | G06Q 30/0645 |
| 10,489,951 B2* | 11/2019 | Gum | ....................... | H04N 7/185 |

(Continued)

FOREIGN PATENT DOCUMENTS

JP  2003-230131 A  8/2003

*Primary Examiner* — Andrew Joseph Rudy
(74) *Attorney, Agent, or Firm* — Kim & Stewart LLP

(57) ABSTRACT

A merchandise management device is provided for a store having a first display location where a number of first merchandise is to be displayed and a second display location where a number of second merchandise is to be displayed. The merchandise management device includes cameras positioned to capture a first image indicating how many of the first merchandise is displayed at the first location and a second image indicating how many of the second merchandise is displayed at the second location, and a processor configured to detect whether or not there is a change in a displayed number of the first merchandise and a displayed number of the second merchandise, and for each merchandise item for which the change is detected, determine a degree and a direction of change and generate a replenishment alert if the degree of change in a decreasing direction is greater than a threshold.

8 Claims, 8 Drawing Sheets

(56) References Cited

U.S. PATENT DOCUMENTS

2017/0116565 A1\* 4/2017 Feiner .................. G06Q 10/087
2018/0005295 A1\* 1/2018 Howell .................... H04Q 9/00

\* cited by examiner

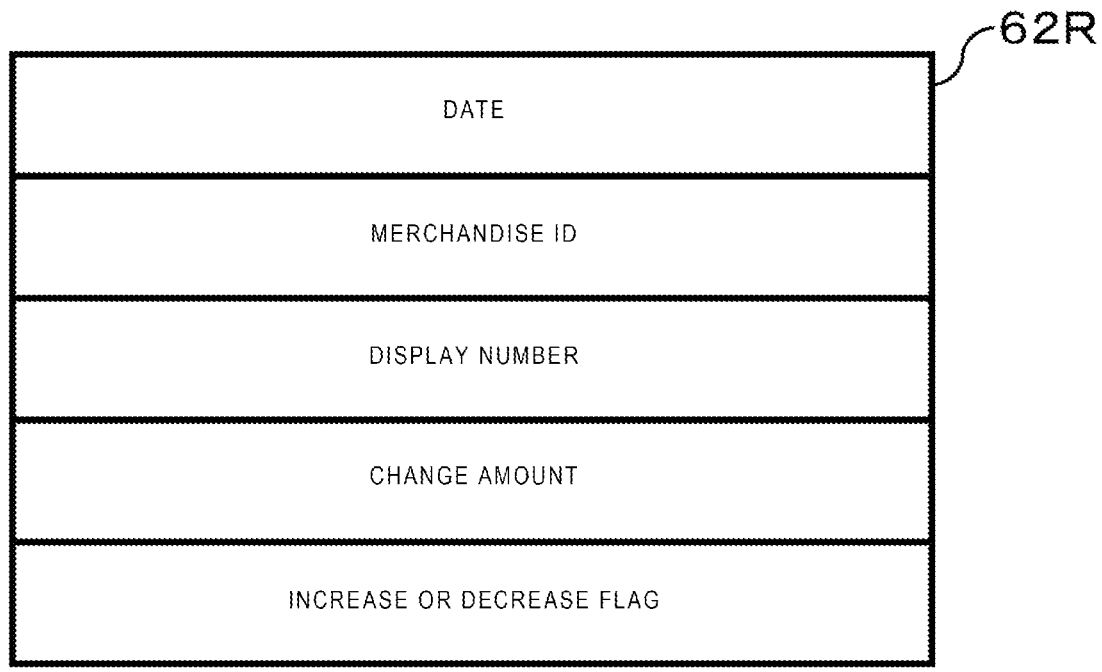

FIG. 7

| PARTITION INFORMATION (71) | DISPLAY NUMBER | PARTITION INFORMATION (72) | DISPLAY NUMBER |
|---|---|---|---|
| 001-1-01 | | 001-1-01 | |
| 001-1-02 | | 001-1-02 | |
| 001-1-03 | | 001-1-03 | |
| 001-2-01 | | 001-2-01 | |
| 001-2-02 | | 001-2-02 | |
| 001-3-01 | | 001-3-01 | |
| ⋮ | ⋮ | ⋮ | ⋮ |
| 999-9-99 | | 999-9-99 | |

| No (73) | PARTITION INFORMATION | MERCHANDISE ID |
|---|---|---|
| 1 | | |
| 2 | | |
| 3 | | |
| 4 | | |
| ⋮ | ⋮ | ⋮ |

MERCHANDISE MANAGEMENT DEVICE AND MERCHANDISE MANAGEMENT METHOD

CROSS-REFERENCE TO RELATED APPLICATION

This application is based upon and claims the benefit of priority from Japanese Patent Application No. 2017-206196, filed in Oct. 25, 2017, the entire contents of which are incorporated herein by reference.

FIELD

Embodiments described herein relate generally to a merchandise management device that manages merchandise displayed on a merchandise shelf or the like and a merchandise management method.

BACKGROUND

In retail stores, store staff confirms merchandise shelves periodically to prevent potential losses in sales because of the merchandise being sold out. If replenishment of the merchandise is delayed due to late confirmation by the store staff, losses merchandise sales may occur. Thus, in the related art, there are known technologies for causing imaging devices to image merchandise shelves, detect merchandise items which are likely to be sold out from the images, and informing the store staff of the inventory state of the merchandise items.

In the technologies of the related art, merchandise items are indicated as merchandise items to be sold out based on the reduced number thereof displayed on the merchandise shelves. However, these merchandise items may be high demand merchandise items and could be sold out before the store staff can replenish the merchandise items.

DESCRIPTION OF THE DRAWINGS

FIG. 5 is a schematic diagram illustrating a data structure of a journal record.

FIG. 6 is a schematic diagram illustrating a structure of a recordkeeping table.

FIG. 7 is a schematic diagram illustrating a memory region of a main memory.

DETAILED DESCRIPTION

Embodiments provide a merchandise management device capable of accurately determining when merchandise items that are high in demand need to be replenished, so as to prevent losses in sales of such merchandise items.

In general, according to one embodiment, a merchandise management device is provided for a store having a plurality of display locations for merchandise, including a first display location where a number of first merchandise is to be displayed and a second display location where a number of second merchandise is to be displayed. The merchandise management device includes one or more cameras positioned to capture a first image indicating how many of the first merchandise is displayed at the first location and a second image indicating how many of the second merchandise is displayed at the second location, and a processor connected to the cameras and configured to detect whether or not there is a change in a displayed number of the first merchandise and a displayed number of the second merchandise, and for each merchandise item for which the change is detected, determine a degree and a direction of change and generate a replenishment alert if the degree of change in a decreasing direction is greater than a threshold.

An embodiment of a merchandise management device capable of accurately determining when merchandise items that are high in demand need to be replenished, so as to prevent losses in sales of such merchandise items, will be described with reference to the drawings.

Figure 1:
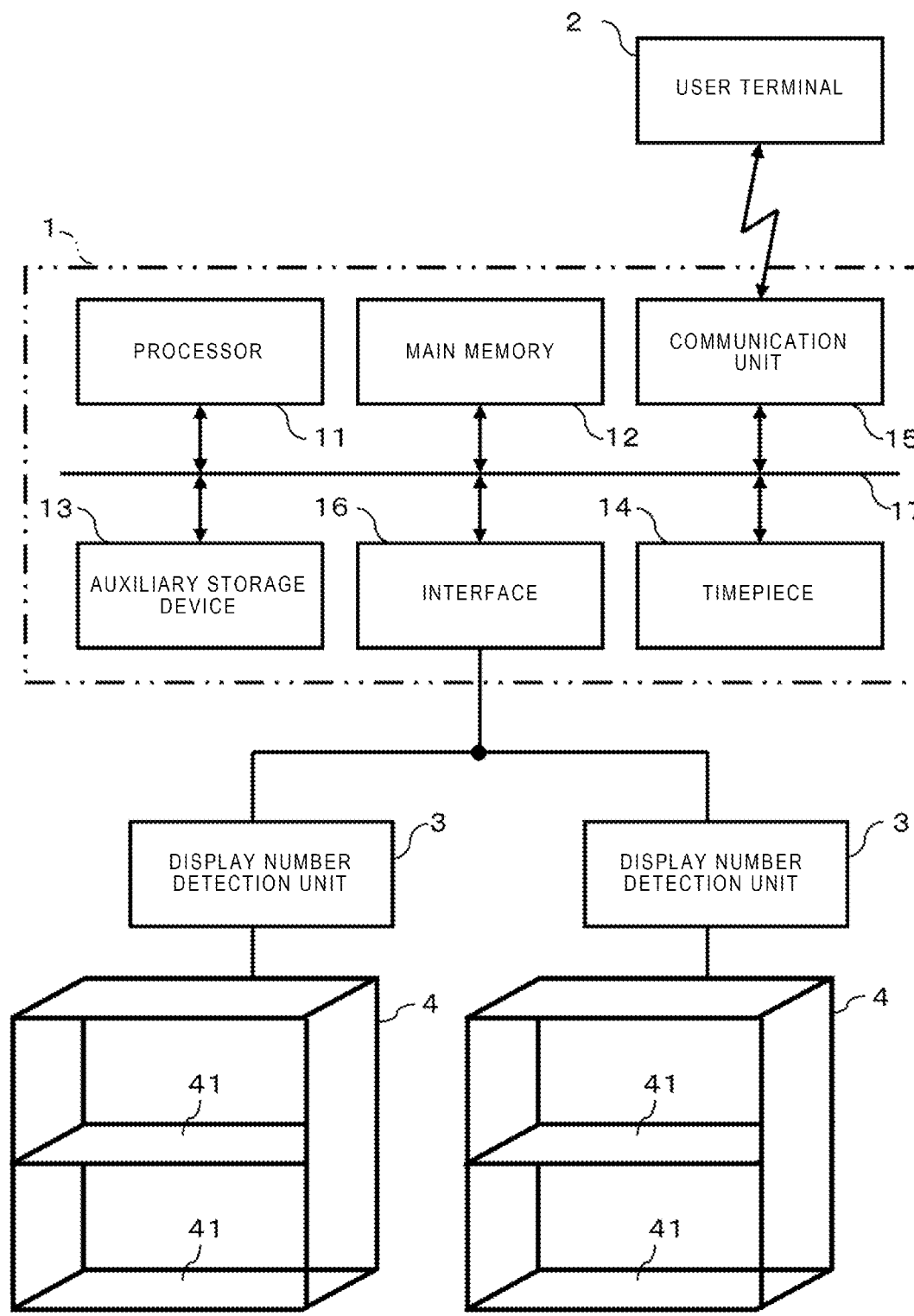
FIG. 1 is a block diagram illustrating a circuit configuration of hardware components of a merchandise management device according to an embodiment.

FIG. 1 is a block diagram illustrating a circuit configuration of hardware components of a merchandise management device 1 according to an embodiment. The merchandise management device 1 includes a processor 11, a main memory 12, an auxiliary storage device 13, a timepiece 14, a communication unit 15, an interface 16, and a system bus 17. In the merchandise management device 1, the processor 11, the main memory 12, the auxiliary storage device 13, the timepiece 14, the communication unit 15, and the interface 16 are connected to the system bus 17 directly or via a signal input and output circuit. In the merchandise management device 1, the processor 11, the main memory 12, and the auxiliary storage device 13, and the system bus 17 connecting the processor 11, the main memory 12, and the auxiliary storage device 13 to each other form a computer.

The processor 11 is a central controlling entity of the computer. The processor 11 controls each unit such that various functions of the merchandise management device 1 can be realized in accordance with an operating system or an application program stored in the main memory 12 or the auxiliary storage device 13.

The main memory 12 includes a nonvolatile memory region and a volatile memory region. The main memory 12 stores an operating system or an application program in the nonvolatile memory region. The main memory 12 stores data necessary for the processor 11 to execute a program to control each unit in the nonvolatile or volatile memory region in some cases. The main memory 12 uses the volatile memory region as a work area in which data can be appropriately rewritten by the processor 11.

The auxiliary storage device 13 is, for example, an electric erasable programmable read-only memory (EEPROM), a hard disc drive (HDD), or a solid state drive (SSD) is used as the auxiliary storage device 13. The auxiliary storage device 13 stores data to be used for the processor 11 to execute various processes or data generated through the processes by the processor 11. The auxiliary storage device 13 stores the application program in some cases.

The timepiece 14 functions as a timer of the merchandise management device 1. The processor 11 determines a current date and time based on time tracked by the timepiece 14.

The communication unit 15 transmits or receives data to and from a user terminal 2 in conformance with a predetermined communication protocol. The user terminal 2 is an information communication terminal of user, such as a store staff, who is in charge of merchandise management and includes at least a display device, an input device, and a communication unit. The display device of the user terminal device 2 can be used to display an alert output from the merchandise management device 1. The input device of the user terminal device 2 can be used to update a database included in the merchandise management device 1. The communication unit of the user terminal device 2 can be used to communicate with the merchandise management device 1. A desktop PC, a notebook PC, a tablet terminal, a smartphone, or the like are examples of the user terminal 2.

The interface 16 is connected to a plurality of display number detection units 3. One display number detection unit 3 is provided for each merchandise shelf 4. Accordingly, in a store in which the plurality of merchandise shelves 4 are installed, the same number of display number detection units 3 is provided. The display number detection unit 3 detects a number of displayed items (hereinafter, referred to as "display number") for each merchandise item displayed on the merchandise shelf 4. Each merchandise item is displayed in a partition determined in advance in the merchandise shelf 4. The partition is a region partitioned with a width in a longitudinal direction by racks 41 of the merchandise shelf 4. The display number indicates the number of merchandise items displayed in the partition set in advance. Even when the same type of merchandise items are displayed in the other partitions, the number of merchandise items in the other partitions is not included in the display number for this partition. Here, the type of merchandise item does not limit, for example, its display in a plurality of continuous partitions. The interface 16 can receive data regarding the display number of each merchandise item detected by each display number detection unit 3.

Figure 2:
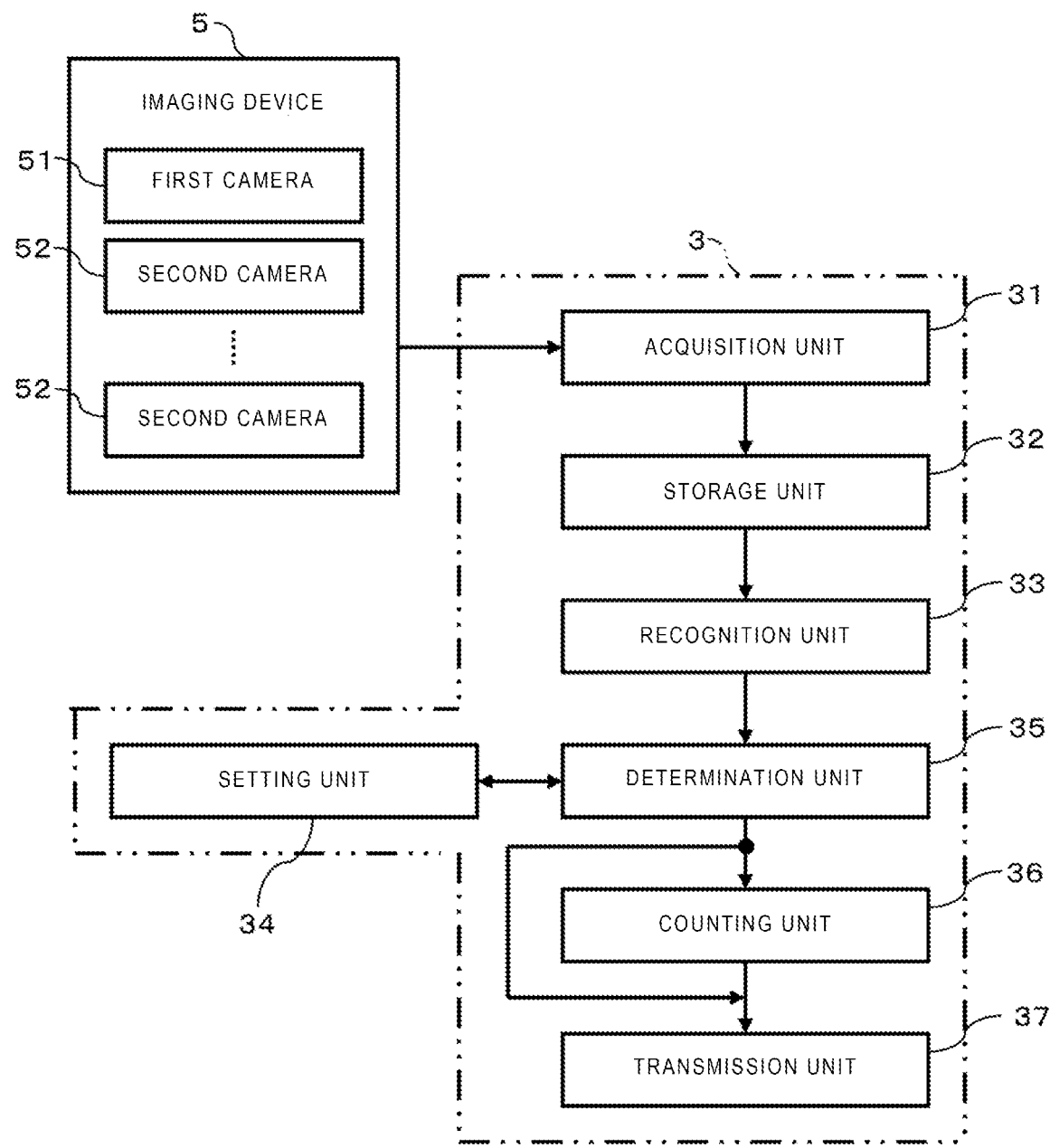
FIG. 2 is a block diagram illustrating a functional configuration of a display number detection unit.

FIG. 2 is a block diagram illustrating a functional configuration of the display number detection unit 3. The display number detection unit 3 is a computing device that includes an acquisition unit 31, which is an interface circuit connected to an imaging device 5, a storage unit 32, a processor programmed to function as a recognition unit 33, a setting unit 34, a determination unit 35, and a counting unit 36, and a transmission unit 37, which is an interface circuit connected to the merchandise management device 1.

The acquisition unit 31 acquires an image captured by an imaging device 5 at a preset sampling period (for example, 10 seconds). The imaging device 5 includes a first camera 51 that images the merchandise shelf 4 from the front side and a plurality of second cameras 52 that image racks of the merchandise shelves 4 from the upper side. Accordingly, the acquisition unit 31 acquires a front image of the merchandise shelf 4 imaged by the first camera 51 and a planar image of each rack imaged by the second camera 52 for each sampling period. The sampling period of 10 seconds is just an example and may be less than or greater than 10 seconds.

The storage unit 32 stores the images acquired by the acquisition unit 31 in synchronization with the sampling period. Accordingly, the storage unit 32 stores a new front image of the merchandise shelf 4 and a new planar image of each rack 41 whenever the sampling period elapses.

The recognition unit 33 analyzes the images stored in the storage unit 32 using a known image recognition technology to recognize an individual front image or planar image of an item present within the partition for each partition of the merchandise shelf 4.

The setting unit 34 sets a reference image of the merchandise item, for which the partition is pre-determined as a display location thereof, for each partition of the merchandise shelf 4. The reference image includes a reference front image when the merchandise item is viewed from the front side and a reference planar image when the merchandise item is viewed from the upper side.

The determination unit 35 compares the front image or the planar image of an individual item recognized for each partition by the recognition unit 33 to the reference front image or the reference planar image set by the setting unit 34 in the partition. Then, the determination unit 35 determines whether the item present in the partition is a regular item in which the partition is set as a display location for each partition. The determination unit 35 gives a display negative alert to the transmission unit 37 when an item other than the regular merchandise item is recognized by the recognition unit 33 in at least one partition.

The display negative alert includes a message indicating that display of merchandise items is negative. The "negative display" means that merchandise items other than items in which the partition is set as a predetermined display location are being displayed in any partition of the merchandise shelf 4. Therefore, the display negative alert includes partition information specifying the partition for which the display negative alert has been generated. The partition information includes a shelf number allocated for each merchandise shelf 4, a rack number allocated for each rack 41 of each merchandise shelf 4, and a partition number allocated for each partition of each rack 41. For example, when the display is negative in the partition with a partition number of "01" in the rack with a rack number of "1" in the merchandise shelf 4 with a shelf number of "001", the display negative alert including partition information "001-1-01" is given to the transmission unit 37.

For each partition of the merchandise shelf 4, the counting unit 36 counts the number of items for which the determination unit 35 determines that the items on the partition are the regular merchandise items in which the partition is set as the display location. Then, the counting unit 36 outputs to the transmission unit 37 data indicating the display number (herein after, referred to as "display number data") indicating the number of merchandise items displayed in a partition specified by the partition information in association with the above-described partition information. That is, display number data is data indicating the display number of merchandise shelf 4 at each partition.

The transmission unit 37 transmits the display number data given from the counting unit 36 and the display negative alert generated by the determination unit 35 to the merchandise management device 1. The display number data or the display negative alert transmitted to the merchandise management device 1 is received by the interface 16 of the merchandise management device 1.

Figure 3:
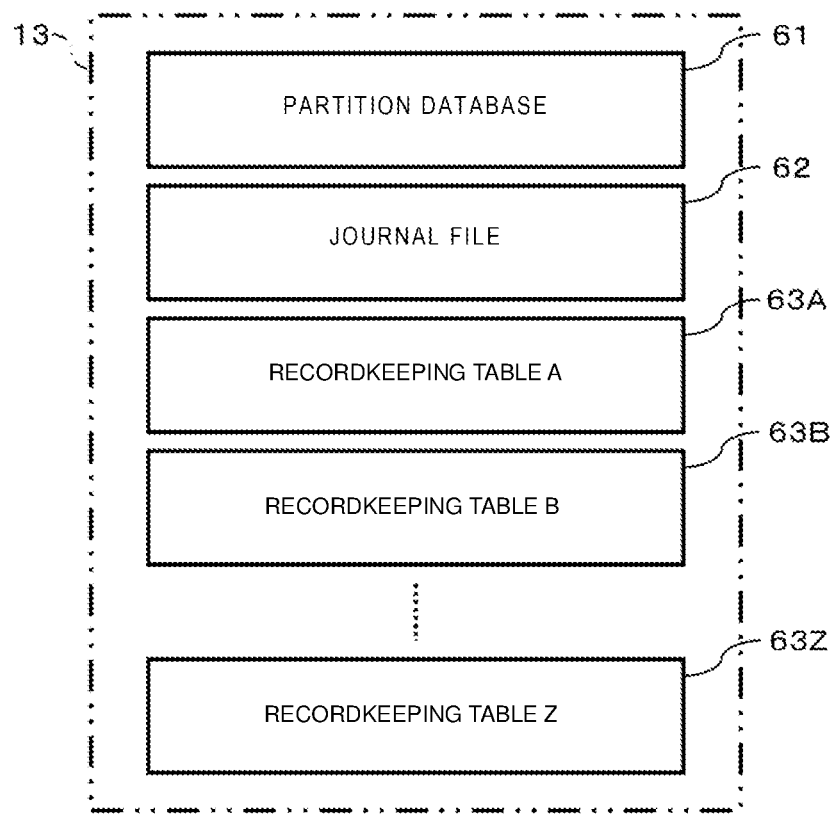
FIG. 3 is a schematic diagram illustrating a part of a storage region of an auxiliary storage device.

FIG. 3 is a schematic diagram illustrating a part of a storage region of the auxiliary storage device 13. As illustrated, the merchandise management device 1 uses a part of the storage region of the auxiliary storage device 13 as a partition database 61, a journal file 62, and a plurality of recordkeeping tables 63 (63A, 63B, . . . , 63Z).

The partition database 61 is a region in which a partition record 61R (see FIG. 4) generated for each partition of the merchandise shelf 4 is stored.

Figure 4:
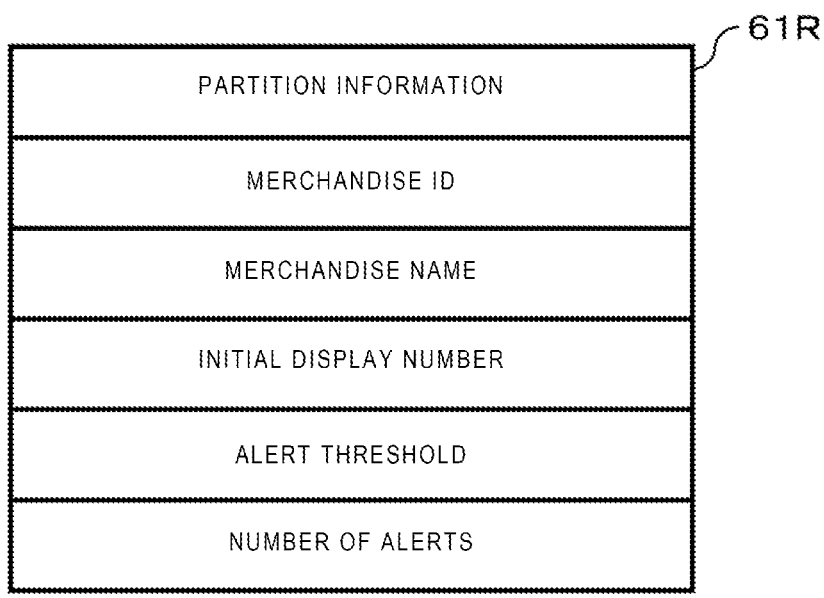
FIG. 4 is a schematic diagram illustrating a data structure of a partition record.

FIG. 4 is a schematic diagram illustrating a data structure of the partition record 61R. As illustrated, the partition record 61R includes entries of partition information, a merchandise ID, a merchandise name, an initial display number, an alert threshold, and the number of alerts generated. The entries included in the partition record 61R are not limited to the foregoing entries and other entries may be included.

The partition information is information for specifying each partition of each merchandise shelf 4. The partition information includes a shelf number, a rack number, and a partition number, as described above. The merchandise ID and the merchandise name are an ID and a product name of a merchandise item displayed in a partition specified with the partition information (hereinafter referred to as the partition). For each merchandise item to be sold in a store, a unique merchandise ID and a unique product name are given. The initial display number is the number of merchandise items displayed in the partition in an initial state. The initial state indicates a state before a store opens or after the merchandise items have been replenished. The alert threshold is a value serving as a determination reference used to determine whether a replenishment alert of a merchandise item displayed in the partition is output. In the embodiment, when the number of merchandise items exceeding the alert threshold has been taken out from the partition within a predetermined period (for example, 300 seconds), the replenishment alert is output. The predetermined period is not limited to 300 seconds and may shorter or longer. A timing at which the replenishment alert is output may be a timing at which the merchandise items equal to or greater than the alert threshold have been taken out from the partition within the predetermined period. The number of alerts is, for example, the number of times the same replenishment alert is output in one business day.

The journal file 62 is a region in which a journal record 62R (see FIG. 5) that is generated each time there is an increase or a decrease in the number of merchandise items displayed in each partition of the merchandise shelf 4, is stored chronologically.

FIG. 5 is a schematic diagram illustrating a data structure of the journal record 62R. As illustrated, the journal record 62R includes entries of a date, a merchandise ID, a display number, a change amount, and an increase or decrease flag. The entries included in the journal record 62R are not limited to the foregoing entries, and other entries may be included.

The date is a date and a time at which the display number of merchandise items is changed. The merchandise ID is an ID of a merchandise item of which the display number is changed. The display number is the number of merchandise items after the change and the change amount is the number of merchandise items increased or decreased before the change. The increase or decrease flag is 1-bit information for identifying whether the change amount increases or decreases. In the embodiment, when the increase is indicated, the increase or decrease flag is set to "1". When the decrease is indicated, the increase or decrease flag is set to "0". Alternatively, when the increase is indicated, the increase or decrease flag may be set to "0". When the decrease is indicated, the increase or decrease flag may also be set to "1".

The data of the journal record 62R stored in the journal file 62 are compiled from various viewpoints, and the compiled data are maintained in the recordkeeping table 63.

FIG. 6 is a schematic diagram illustrating a structure of the recordkeeping table 63. As described above, in the auxiliary storage device 13, the plurality of recordkeeping tables 63A, 63B, . . . , and 63Z are maintained. The tables basically have the same structure as the structure illustrated in FIG. 6. As illustrated, the recordkeeping table 63 has a matrix structure in which the first field of each row is a region of the merchandise ID and the second and subsequent fields are regions of T01, T02, T03, . . . , and T99. The merchandise ID of each merchandise item displayed on the merchandise shelf 4 is set in the first field of each row.

When the recordkeeping table 63 is a table that stores display number of various merchandise items over multiple periods of time, the periods T01 to T99 are periods of time at an interval of 1 hour. When the period of time is one day, the periods T01 to T31 are used to represent the 1st to 31st days. When the period of time is one week, the periods T01 to T05 are used to represent the 1st to 5th weeks. When the period of time is one month, the periods T01 to T12 are used to represent January to December.

FIG. 7 is a schematic diagram illustrating a memory region of the main memory 12. As illustrated, in the main memory 12, a current memory 71, a previous memory 72, and a monitoring target memory 73 are provided. Each of the current memory 71 and the previous memory 72 has a region in which the display number can be stored in association with the partition information for all the partitions of the merchandise shelf 4. The monitoring target memory 73 has a region in which the partition information and the merchandise ID that are associated with each other are assigned a serial number and stored in the order of the serial number. The uses of the current memory 71, the previous memory 72, and the monitoring target memory 73 will be described along with a description of the operation of the merchandise management device 1 provided below.

Figure 8:
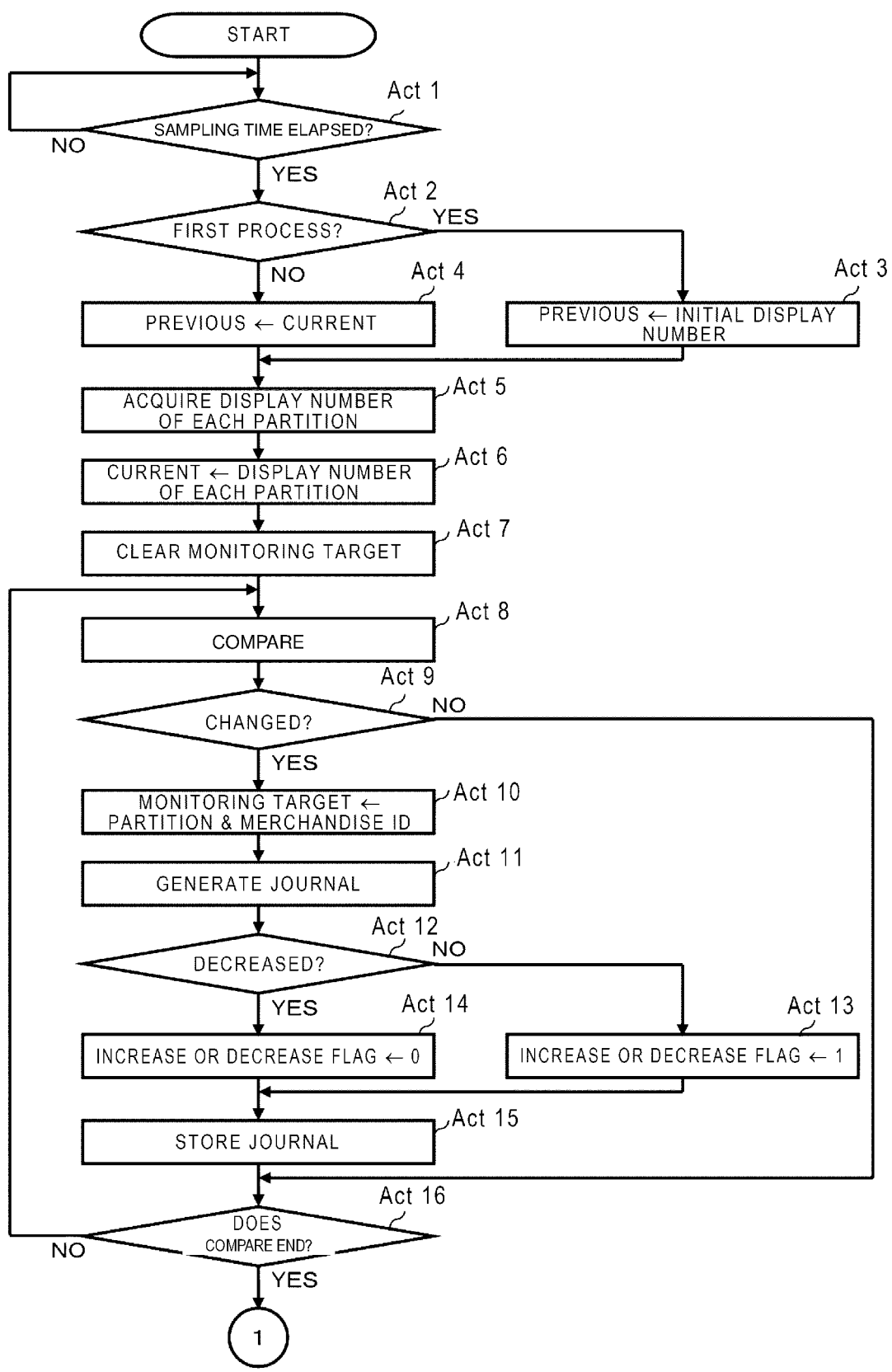
FIGS. 8 and 9 depict a flowchart illustrating a procedure of a first process executed by a processor of the merchandise management device in accordance with a merchandise management program.
Figure 9:
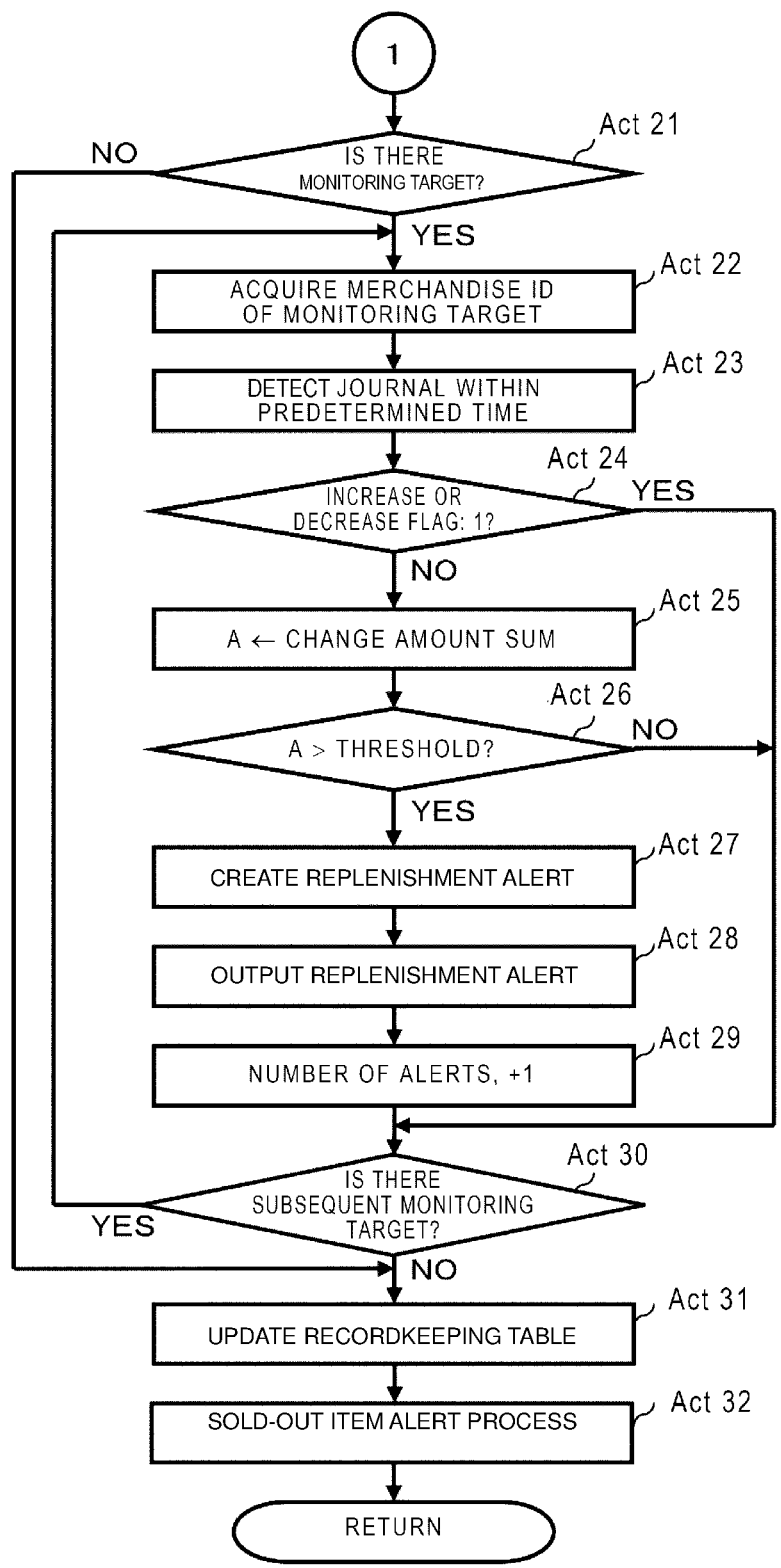
Figure 10:
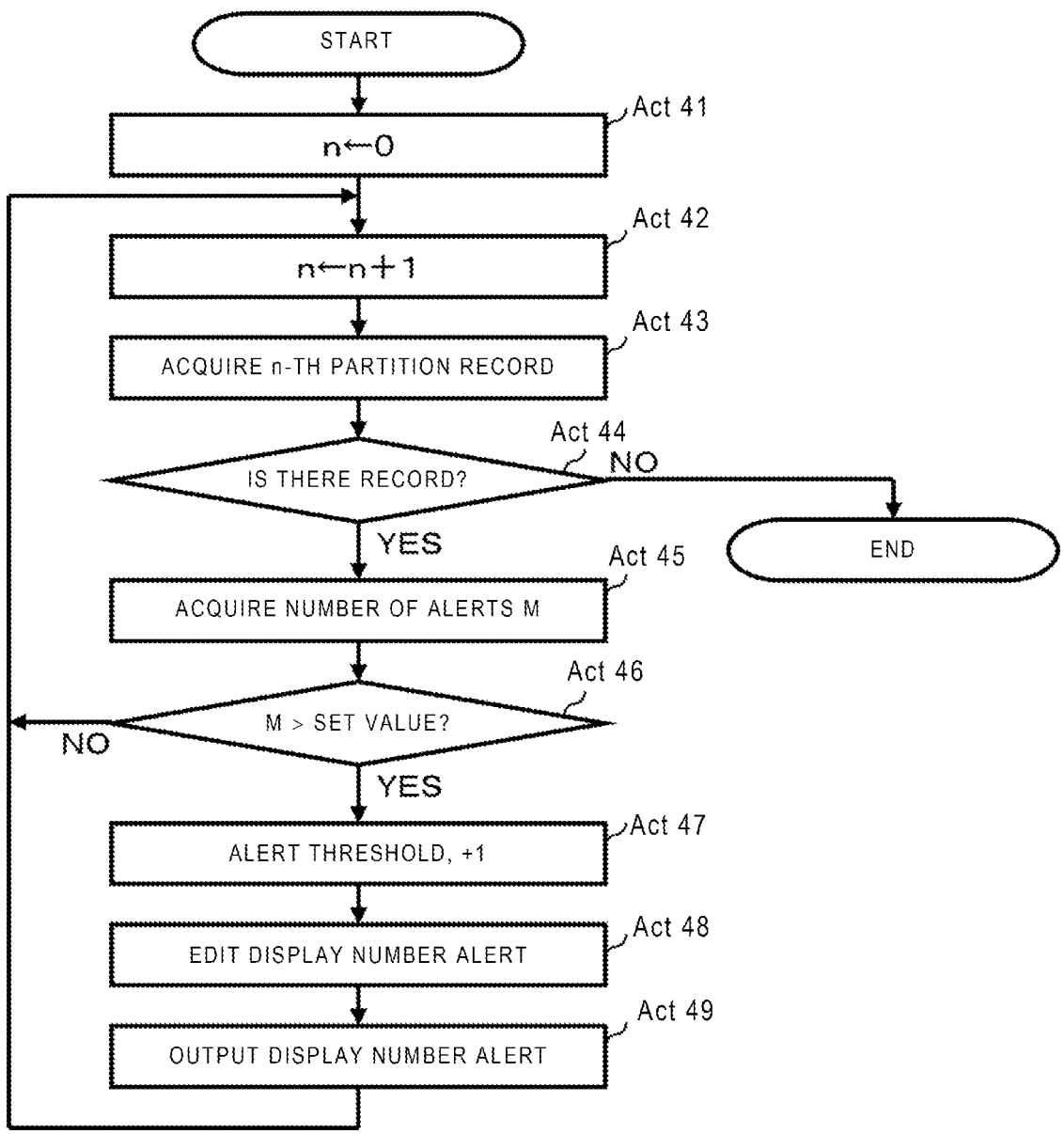
FIG. 10 is a flowchart illustrating a procedure of a second process executed by the processor of the merchandise management device in accordance with a merchandise management program.

FIGS. 8 and 9 are flowcharts illustrating a procedure of a first process executed by the processor 11 in accordance with a merchandise management program. FIG. 10 is a flowchart illustrating a procedure of a second process executed by the processor 11 in accordance with a merchandise management program. The merchandise management program is an application program stored in the main memory 12 or the auxiliary storage device 13. The first process is executed in synchronization with a sampling period of the above-described acquisition unit 31 between an opening time and a closing time of a store. The second process is executed at a predetermined time after the closing time of the store. Hereinafter, an operation of the merchandise management device 1 will be described with reference to the flowcharts. The operations to be described below are merely examples and the procedures are not particularly limited to these examples as long as the same results can be obtained.

As illustrated in FIG. 8, the processor 11 waits for a sampling time at the same interval as the sampling period of the acquisition unit 31 to pass in Act 1. Then, when the processor 11 confirms that the sampling time elapsed (YES in Act 1), the processor 11 confirms whether the process is a first process after an opening time of the store in Act 2. When the process is the first process (YES in Act 2), the processor 11 acquires the partition information and an initial display number from each partition record 61R stored in the partition database 61 in Act 3. Then, the processor 11 writes the initial display number in a display number area of the previous memory 72 corresponding to the same partition information as the partition information acquired from each partition record 61R. When the process is a process subsequent to the first process (NO in Act 2), the processor 11 writes the display number of each partition information stored in the current memory 71 in the display number area of each corresponding partition information in the previous memory 72 in Act 4.

When the process of Act 3 or Act 4 ends, the processor 11 acquires the display number data from the display number detection unit 3 of each merchandise shelf 4 in Act 5. The display number data indicates the number of merchandise items displayed in the partition specified with the partition information in association with the partition information, as described above. The processor 11 writes the display number of each piece of partition information obtained from the display number data on the display number area of the current memory 71 corresponding to the same partition information. The processor 11 clears a partition information area and a merchandise ID area of the monitoring target memory 73 in Act 7. A timing at which the monitoring target memory 73 is cleared is not limited to the time point of Act 7. For example, before the process of Act 5, the monitoring target memory 73 may be cleared.

The processor 11 then compares the display number of the next partition information stored in the current memory 71 with the display number stored in the display number area of the corresponding partition information in the previous memory 72 in Act 8. Then, in Act 9, the processor 11 confirms whether the display number has changed. When the display number is not changed (NO in Act 9), the processor 11 causes the process to proceed to Act 16.

When the display number has changed (YES in Act 9), the processor 11 writes the partition information regarding the partition in which the display number has changed and the merchandise ID of the merchandise item displayed in the partition in the monitoring target memory 73 in Act 10. The merchandise ID can be acquired from the partition database 61.

The processor 11 generates the journal record 62R based on the partition information and the merchandise ID written in the monitoring target memory 73 in Act 11. The date can be acquired from the timepiece 14. The display number can be acquired by retrieving the current memory 71 using the partition information as a key for the retrieval. The change amount can be acquired by retrieving the current memory 71 and the previous memory 72 using the partition information as the key for retrieval and calculating a difference in the display numbers.

The processor 11 confirms whether the display number of the current memory 71 has increased or decreased from the display number of the previous memory 72 in Act 12. When the display number has increased (NO in Act 12), the processor 11 sets the increase or decrease flag of the journal record 62R generated in the process of Act 11 to "1" in Act 13. Conversely, when the display number has decreased (YES in Act 12), the processor 11 sets the increase or decrease flag of the same journal record 62R to "0" in Act 14.

When the process of Act 13 or Act 14 ends, the processor 11 stores the journal record 62R in the journal file 62 in Act 15. Thereafter, the processor 11 causes the process to proceed to Act 16.

In Act 16, the processor 11 confirms whether the comparison of the display number of the current memory 71 with the display number of the previous memory 72 ends. When the comparison does not end (NO in Act 16), the processor 11 returns the process to Act 8. Then, the processor 11 compares the display number of the current memory 71 corresponding to the next partition information with the display number of the previous memory 72 and repeats the same process as before.

Here, the computer in which the processor 11 is a central controlling entity functions as a detection unit that detects a change in the display number for each merchandise item by executing the processes of Act 1 to Act 16.

When the comparison of the display number of the current memory 71 with the display number of the previous memory 72 ends (YES in Act 16), the processor 11 confirms in Act 21 of FIG. 9 whether the partition information and the merchandise ID are written in the monitoring target memory 73. When there is no change in the number of merchandise items displayed on the merchandise shelf 4 between a time point at which a previous sampling time elapses and a time point at which a current sampling time elapses, the partition information and the merchandise ID are not written in the monitoring target memory 73. When the partition information and the merchandise ID are not written on the monitoring target memory 73 (NO in Act 21), the processor 11 causes the process to proceed to Act 31 to be described below.

Conversely, when the display number is changed for at least one of the merchandise items displayed on the merchandise shelf 4, the merchandise ID(s) of the merchandise item(s) with the changed display number and the partition information regarding the partition in which the merchandise items are displayed are written in the monitoring target memory 73. When the partition information and the merchandise ID are written in the monitoring target memory 73 (YES in Act 21), the processor 11 acquires the next merchandise ID with the changed display number from the monitoring target memory 73 in Act 22.

When the merchandise ID is acquired, the processor 11 retrieves the journal file 62 using the merchandise ID as the key for retrieval in Act 22. Then, the processor 11 retrieves the journal record 62R1 including a date of the time point at which the current sampling time elapses to a date before a predetermined period (in the embodiment, 300 seconds) among the journal records 62R including the merchandise ID set as the key for retrieval.

In Act 24, the processor 11 confirms whether there is the journal record 62R1 in which the increase or decrease flag is set to "1" among the journal records 62R1. When the increase or decrease flags of the journal records 62R1 are all "0" (NO in Act 24), the processor 11 sums all of the change amounts included in the journal records 62R1 to calculate a change amount sum A in Act 25. Then, in Act 26, the processor 11 confirms whether the change amount sum A exceeds the alert threshold of the merchandise item. The alert threshold can be acquired by retrieving the partition database 61 using the merchandise ID acquired in the process of Act 22. When the change amount sum A is equal to or less than the alert threshold (NO in Act 26), the processor 11 causes the process to proceed to Act 30.

Conversely, when the change amount sum A exceeds the alert threshold (YES in Act 26), the processor 11 creates the replenishment alert in Act 27. The replenishment alert includes a number of items to be replenished (herein after, referred to as "replenishment number") and a message for giving an instruction to replenish the merchandise item specified with the merchandise ID acquired in the process of Act 22. The replenishment number is a value obtained by subtracting the display number at the time point at which the current sampling time elapses from the initial display number of the merchandise items. In Act 28, the processor 11 controls the communication unit 15 such that the replenishment alert is transmitted to the user terminal 2. In Act 29, the processor 11 adds one to the number of alerts of the partition record 61R including the merchandise ID acquired in the process of Act 22. Thereafter, the processor 11 causes the process to proceed to Act 30.

Conversely, when there is even one journal record 62R1 in which the increase or decrease flag is set to "1" (YES in Act 24), the processor 11 does not execute the processes of Act 25 to Act 29 described above. The processor 11 causes the process to immediately proceed to Act 30.

In Act 30, the processor 11 confirms whether another partition information and merchandise ID are stored in the monitoring target memory 73. When the subsequent partition information and merchandise ID are stored (YES in Act 30), the processor 11 returns the process to Act 22 and acquires the next merchandise ID from the monitoring target memory 73. Then, the processor 11 executes the processes of Act 23 to Act 30 described above using the next merchandise ID.

Here, the computer in which the processor 11 is a central controlling entity functions as a determination unit that determines the degree of change in the decreasing direction of the merchandise items on which the change in the display number is detected, in other words, the change amount sum by executing the processes of Act 21 to Act 25. In addition, the computer configures an output unit that outputs a replenishment alert for the merchandise item on which the degree of change in the decreasing direction is determined to be greater than a threshold, in other words, the alert threshold by executing the processes of Act 26 to Act 28. Further, the computer functions as a counting unit that counts the number of times the replenishment alert is output for each merchandise item by executing the process of Act 29.

When the processes of Act 23 to Act 30 end for all the merchandise IDs stored in the monitoring target memory 73, the processor 11 determines in Act 30 whether another partition information and merchandise ID are not stored in the monitoring target memory 73. When the processor 11 determines that another partition information and merchandise ID are not stored (NO in Act 30), the processor 11 causes the process to proceed to Act 31.

In Act 31, the processor 11 updates the recordkeeping table 63 based on the journal record 62R in which the time point at which the current sampling time elapses is a date.

Specifically, for example, for the recordkeeping table 63A in which a decreased display number is added according to periods of time, the processor 11 adds the change amount of the journal record 62R to a value of the period of times including the time point at which the current sampling time elapses and corresponding to the merchandise ID of the journal record 62R with the increase or decrease flag of "0". Similarly, for example, for the recordkeeping table 63B in which a decreased display number is added according to days, the processor 11 adds the change amount of the journal record 62R to a value of a date including the time point at which the current sampling time elapses and corresponding to the merchandise ID of the journal record 62R with the increase or decrease flag of "0". The same applies to the recordkeeping table 63 of each week or each month.

For example, for the recordkeeping table 63C in which an increased display number is added according to periods of time, the processor 11 adds the change amount of the journal record 62R to a value of the periods of time including the time point at which the current sampling time elapses and corresponding to the merchandise ID of the journal record 62R with the increase or decrease flag of "1". Similarly, for example, for the recordkeeping table 63D in which an increased display number is added according to days, the processor 11 adds the change amount of the journal record 62R to a value of the date including the time point at which the current sampling time elapses and corresponding to the merchandise ID of the journal record 62R with the increase or decrease flag of "1". The same applies to the recordkeeping table 63 of each week or each month.

When the updating of the recordkeeping tables 63 ends, the processor 11 executes sold-out item alert processing in Act 32. In this process, it is confirmed whether the display number equal to or less than a second threshold preset for a sold-out item alert is included in the display number stored in the current memory 71. For example, when merchandise items of which the display number is equal to or less than 5 are treated as merchandise items close to being sold out, the second threshold is set to "5". The second threshold may be common to all the merchandise items or may be set for each merchandise item. When the display number equal to or less than the second threshold is included in the current memory 71, the processor 11 controls the communication unit 15 such that the sold-out item alert is created and transmitted to the user terminal 2. The sold-out item alert includes a replenishment number and a message for notifying that the merchandise item specified with the merchandise ID of which the display number is equal to or less than the second threshold is close to the defective object. The replenishment number is a value obtained by subtracting the display number at the recent sampling time point from the initial display number of merchandise items.

When the sold-out item alert processing ends, the processor 11 returns the process to Act 1 of FIG. 8. Accordingly, the processor 11 repeatedly executes the processes of Act 2 to Act 32 whenever the sampling period elapses between an opening time and a closing time of a store.

When a display negative alert is received from the display number detection unit 3 during a period from the opening time to the closing time of the store, the processor 11 controls the communication unit 15 such that the display negative alert is transmitted to the user terminal 2.

Thus, when a replenishment alert is received in the user terminal 2, a necessary replenishment number and a message for prompting replenishment of merchandise items are displayed on the display device. When the sold-out item alert is received, a necessary replenishment number and a message for notifying that the merchandise items are close to being sold-out are displayed on the display device. When the display negative alert is received, a message for notifying that the wrong merchandise is placed is displayed on the display device.

Accordingly, when a user of the user terminal 2, for example, a store staff, confirms a message displayed by the replenishment alert or the sold-out item alert, that is, a message for giving an instruction to replenish the merchandise items, the number of replenished merchandise items displayed along with the message may be replenished on the merchandise shelf 4. In this way, the display number on the merchandise shelf 4 returns to the initial display number. When the store staff confirms the message displayed by the display negative alert, that is, the message for notifying that the wrong merchandise is placed, the merchandise shelf 4 may be rearranged. In this way, the merchandise items displayed in another partition of the merchandise shelf 4 are returned to the original partition.

Then, when a predetermined time comes after the closing time, the processor 11 starts a process in a procedure indicated in the flowchart of FIG. 10. The processor 11 first resets a counter n to "0" in Act 41. Subsequently, the processor 11 counts up the counter n by "1" in Act 42. Then, the processor 11 acquires an n-th partition record 61Rn from the partition database 61 in Act 43. Here, "n" of the n-th partition record is identical to a value of the counter n.

In Act 44, the processor 11 confirms whether the n-th partition record 61Rn can be acquired from the partition database 61. When the partition record 61Rn can be acquired (YES in Act 44), the processor 11 acquires the number of alerts M from the partition record 61Rn in Act 45. Then, in Act 46, the processor 11 confirms whether the number of alerts M exceeds a set value. The set value is any value set by the user of the merchandise management device 1. The user sets an allowable upper limit of the number of alerts output for one merchandise item in one business day as the set value.

When the number of alerts M is equal to or less than the set value (NO in Act 46), the processor 11 returns the process to Act 42. That is, the processor 11 further counts up the counter n by "1" and acquires the n-th partition record 61Rn from the partition database 61. Then, the processor 11 acquires the number of alerts M from the n-th partition record 61Rn and repeats the process of comparing the number of alerts M to the set value.

When the merchandise ID of which the number of alerts exceeds the set value is detected in Act 46 (YES in Act 46), the processor 11 increases an alert threshold (first threshold value) of the partition record 61R including the merchandise ID by "1" in Act 47. By increasing the alert threshold, it is possible to suppress an occurrence frequency of the replenishment alert for the merchandise item. The processor 11 creates a display number alert in Act 48. The display number alert includes a message for giving an instruction to reexamine the initial display number of the merchandise item. The fact that the number of alerts exceeds the set value means that the sales pace of the merchandise item is considerably fast. Thus, by reexamining the initial display number in an increasing direction, it is possible to prevent losing sales because an item is sold-out.

In Act 49, the processor 11 controls the communication unit 15 such that the display number alert is transmitted to the user terminal 2. Thereafter, the processor 11 returns the process to Act 42 and executes the process subsequent to Act 42 in the above-described manner. As a result, when the n-th partition record 61R may not be acquired from the partition database 61 (NO in Act 44), the processor 11 ends the second process.

Here, the computer in which the processor 11 is a central controlling entity functions as an adjustment unit that adjusts a regulation, in other words, the alert threshold, used to determine whether the degree of change in the decreasing direction is large according to the number of alerts by executing the processes of Act 41 to Act 47.

In this way, in the merchandise management device 1, the replenishment alert for prompting replenishment of the merchandise items is output from the user terminal 2 with regard to the merchandise items of which the number exceeding the alert threshold is extracted from the merchandise shelf 4 within a predetermined period (for example, 300 seconds). The merchandise items of which the number exceeding the alert threshold is extracted from the merchandise shelf 4 within the predetermined period can be estimated to be merchandise items of which a sales pace is fast. That is, for the merchandise items of which a sales pace is fast, the replenishment alert is output at a time point at which the number of merchandise items exceeding the alert threshold is extracted from the merchandise shelf 4 within the predetermined period.

For example, when 20 merchandise items of which the alert threshold is set to 5 are displayed and 6 merchandise items are extracted from the merchandise shelf 4 within the predetermined period, the replenishment alert is output. That is, even when 16 merchandise items are still displayed on the merchandise shelf 4, the replenishment alert is output. Accordingly, even when it takes some time for the store staff confirming the replenishment alert to replenish the merchandise items, the merchandise items are not first sold out before the replenishment. In this way, since the merchandise management device 1 can accurately give an instruction to replenish the merchandise items of which the sales pace is fast, it is possible to prevent a loss of a chance to sell the merchandise items due to the item being sold-out.

Further, in the replenishment alert, a value obtained by subtracting the display number at the current time point from the initial display number is reported as a replenishment number. Accordingly, when the initial display number of merchandise items in the foregoing example is assumed to 20, 4 merchandise items are reported as the replenishment number, and therefore the store staff replenishes 4 merchandise items. In this way, when the merchandise items are not extracted within a period from occurrence of the replenishment alert to the replenishment, the initial display number of merchandise items is displayed on the merchandise shelf 4 by replenishing the merchandise items. Even when several merchandise items are extracted within the period from the occurrence of the replenishment alert to the replenishment, the number of merchandise items close to the initial display number is displayed on the merchandise shelf 4 immediately after the replenishment. In this way, even when the sales pace of the merchandise items is fast, the merchandise items are accurately replenished according to the replenishment alert, so that many merchandise items are always normally displayed on the merchandise shelf 4. According to the psychology of customers, when many well-selling merchandise items are displayed, a desire to buy increases and the number of customers buying the merchandise items together increases. Accordingly, since the sales pace further increases, sales are accelerated.

For merchandise items of which a sales pace is slow, the replenishment alert is not output. However, when the display number is decreased up to the second threshold, the sold-out item alert is output. Therefore, the store staff may replenish the merchandise items according to the sold-out item alert. Thus, even when the replenishment is late, that does not pose a problem because the sales pace is slow. Therefore, the merchandise items are unlikely to be sold out.

In the merchandise management device 1, the replenishment alert is not output even when the number of merchandise items exceeding the alert threshold is extracted from the merchandise shelf 4 within the predetermined period and the merchandise items are being replenished. Accordingly, since a troublesome situation in which merchandise items have to be replenished immediately does not occur, a store staff in charge of the replenishment can execute work of replenishing the merchandise items efficiently.

Incidentally, the merchandise management device 1 includes the recordkeeping tables 63. According to the recordkeeping tables 63, the number of merchandise items extracted from the merchandise shelf 4 or the number of merchandise items replenished on the merchandise shelf is summed for each merchandise item at each period of time, each day, each week, or each month. Accordingly, by analyzing data of the recordkeeping tables 63, it is possible to ascertain a period of time of good selling, a day of week, a month, or the like.

Hereinafter, modification examples of the embodiment will be described.

In the foregoing embodiment, the case in which one display number detection unit 3 is prepared for one merchandise shelf 4 was given as an example. One display number detection unit 3 may be prepared for two or more merchandise shelves 4 as long as the display number of merchandise items displayed in each partition of two or more merchandise shelves 4 can be detected by one display number detection unit 3. The location in which merchandise items of which the display number is detected by the display number detection unit 3 are displayed is not limited to the merchandise shelf 4. For example, merchandise items displayed on a floor of a store may be the display number of units detected by the display number detection unit 3.

In the foregoing embodiment, the first camera 51 that images the merchandise shelf 4 from the front side and the plurality of second cameras 52 that image each rack of the merchandise shelf 4 from the upper side were given as example of the imaging device 5 that images displayed merchandise items. From this viewpoint, for example, the first camera may be omitted as long as the display number detection unit 3 can detect the display number at each partition using only images captured by the second cameras. As long as the display number detection unit 3 can detect the display number at each partition using images captured cameras different from the first camera 51 or the second cameras 52, the cameras may be used as the imaging device 5.

In the foregoing embodiment, the case in which the display number detection unit 3 detects the display number of each kind of merchandise items from an image captured by the imaging device 5 was given as an example. A method of detecting the display number is not limited to the method in which an image is used. For example, the display number of each kind of merchandise items may be detected by giving a radio frequency identification (RFID) tag to each merchandise item displayed on the merchandise shelf 4 and causing a tag reader to read information regarding the RFID tag of each kind of merchandise items.

The merchandise management device 1 is generally delivered in a state in which a program such as the merchandise management program is stored in the main memory 12 or the auxiliary storage device 13. However, embodiments are not limited thereto. The merchandise management device 1 may be delivered in a state in which a program is not stored in the main memory 12 or the auxiliary storage device 13. In this case, the merchandise management program or the like delivered separately from the merchandise management device 1 may be written on a writable storage device included in the merchandise management device 1 through an operation by a user or the like. The delivery of the merchandise management program or the like may be recorded on a removable recording medium or performed through communication via a network. Any type of recording medium can be used as long as the recording medium can store a program or a device can read the program, like a CD-ROM or a memory card. A function obtainable by installing or downloading a program can be realized in cooperation with an operating system (OS) inside a device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A merchandise inventory management device system, comprising:

a merchandise display region in a store;

one or more cameras positioned to capture an image of the merchandise display region and configured to capture the image of the merchandise display region in each of a plurality of sampling intervals during a detection period;

a detection circuit connected to the camera and configured to perform, for each of the plurality of sampling intervals during the detection period, a detection process to detect a change in a displayed number of merchandise of a particular kind at the merchandise display region based on the image captured during the sampling interval; and a processing circuit configured to:

determine whether or not there is a change in the displayed number based on a result of the detection process for each of the of the plurality of sampling intervals, upon determining that there is a change in the displayed number, determine a total number of decrease in the displayed number during a past predetermined period of time that is longer than the sampling interval, upon the determined total number of decrease in the displayed number being greater than a first threshold, cause a replenishment alert to be transmitted to a user terminal, count a total number of transmitting the replenishment alert during the detection period, and upon the counted total number of transmitting the replenishment alert being greater than a second threshold, increase the first threshold.

2. The merchandise inventory management system according to claim 1, wherein upon the determined total number of decrease in the displayed number being greater than a first threshold, the processor determines a number of the merchandise of the particular kind to be replenished and includes the determined number in the replenishment alert.

3. The merchandise inventory management system according to claim 2, wherein the processor is configured to store an indication that there is a change in the displayed number and whether the change is in an increasing direction or a decreasing direction, upon determining that there is a change in the displayed number.

4. The merchandise inventory management system according to claim 3, wherein the processor does not generate the replenishment alert for a merchandise if the direction of change for the merchandise is in the increasing direction for any one sampling interval within the detection period.

5. The merchandise inventory management system according to claim 4, wherein the detection period is one day.

6. The merchandise inventory management system according to claim 1, wherein the merchandise display region includes a shelf having a plurality of tiers, and the one or more cameras include a plurality of cameras corresponding to the plurality of tiers, respectively, each of the plurality of cameras being positioned to capture an image of a corresponding one of the tiers.

7. The merchandise inventory management system according to claim 1, wherein the processor is configured to generate a sold-out item alert after generating the replenishment alert when the displayed number is less than a minimum number.

8. The merchandise inventory management system according to claim 1, wherein the processor is configured to generate a wrong item alert upon detecting that merchandise not of the particular kind is displayed at the merchandise display region.

\* \* \* \* \*